Figure 1:
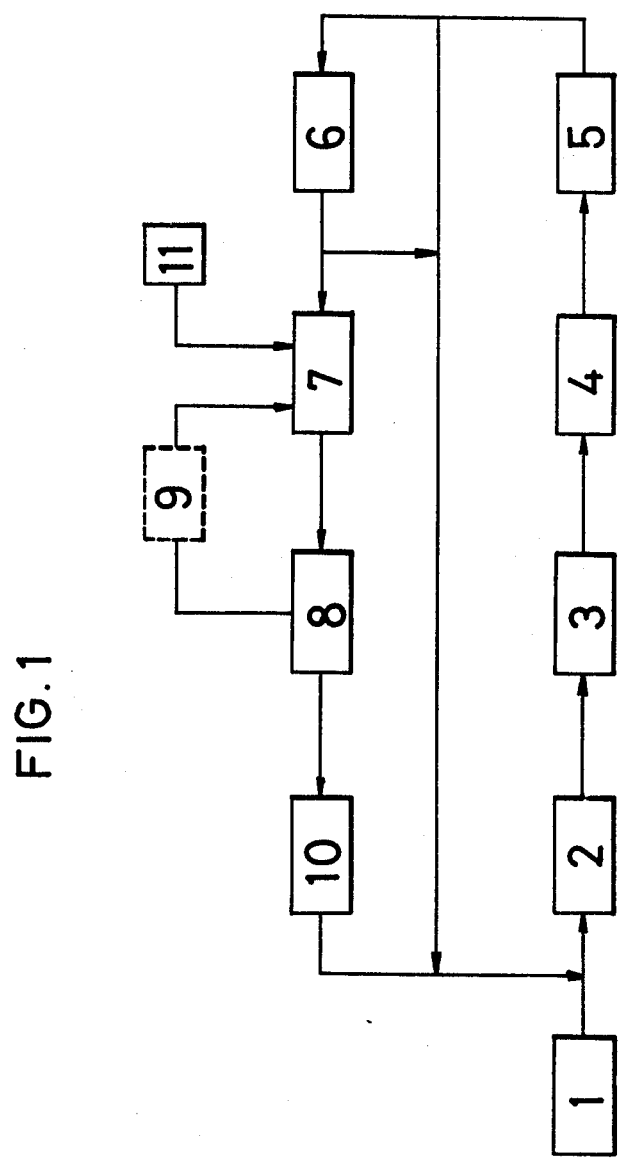

United States Patent [19]

Inao et al.

[11] 4,215,094

[45] Jul. 29, 1980

[54] METHOD FOR THE REMOVAL OF ORGANIC SUBSTANCES FROM ALKALI METAL ALUMINATE SOLUTION

[75] Inventors: Jun-ichi Inao; Koichi Yamada; Takuo Harato; Hisakatsu Kato, all of Niihama, Japan

[73] Assignee: Sumitomo Aluminum Smelting Company, Ltd., Osaka, Japan

[21] Appl. No.: 11,568

[22] Filed: Feb. 12, 1979

[30] Foreign Application Priority Data

Feb. 17, 1978 [JP] Japan .................................. 53/17904

[51] Int. Cl.$^2$ ............................. C01F 7/06; C01F 7/46
[52] U.S. Cl. .................................... 423/123; 423/130; 423/600; 423/121
[58] Field of Search ....................... 423/119, 121–123, 423/130, 600

[56] References Cited

U.S. PATENT DOCUMENTS

| | | | |
|---|---|---|---|
| 3,372,985 | 3/1968 | Roberts et al. | 423/130 |
| 3,512,926 | 5/1970 | Mercier et al. | 423/600 |
| 3,649,185 | 3/1972 | Sato et al. | 423/600 |
| 4,046,855 | 9/1977 | Schepers et al. | 423/600 |
| 4,101,629 | 7/1978 | Mercier et al. | 423/130 |

FOREIGN PATENT DOCUMENTS

| | | | |
|---|---|---|---|
| 36-30458 | 12/1961 | Japan | 423/600 |
| 335920 | 2/1970 | U.S.S.R. | 423/119 |
| 339505 | 6/1972 | U.S.S.R. | 423/600 |

*Primary Examiner*—Herbert T. Carter
*Attorney, Agent, or Firm*—Wenderoth, Lind & Ponack

[57] ABSTRACT

In the production of alumina from bauxite by the Bayer process, the present invention provides an improvement for effectively and economically removing organic substances from a circulating alkali aluminate solution by contacting the aluminate solution containing organic substances with molecular oxygen gas or a molecular oxygen-containing gas in the presence of copper ions as a catalyst at an elevated temperature, thereby oxidizing the organic substances, adding a chemical substance to the resulting aluminate solution which reacts with copper ions to deposit a water-insoluble precipitate, and separating the precipitate from the solution, and recycling the precipitate as a copper source to the above-mentioned wet oxidation procedure.

11 Claims, 1 Drawing Figure

METHOD FOR THE REMOVAL OF ORGANIC SUBSTANCES FROM ALKALI METAL ALUMINATE SOLUTION

The present invention relates to a method for the production of alumina from alumina-containing ores by the Bayer process or improved processes thereof (hereinafter inclusively referred to as the Bayer process). More particularly, the invention relates to a method for removing organic substances in an alkali aluminate solution of the Bayer process.

As is well known, the production of alumina by the Bayer process comprises the steps of treating alumina-containing ores (hereinafter referred to as the bauxite) with a hot alkali solution such as a caustic soda solution or a mixed solution of caustic soda and sodium carbonate at a temperature generally above 130° C. to extract the alumina portions contained in the bauxite (the digestion step); separating undissolved residues comprising iron oxide, silicates, titanium oxide and the like as red mud from the slurry obtained in the digestion step (the red mud separation step); adding aluminum hydroxide as seeds to the clear solution of alkali aluminate after the separation of the undissolved residues (hereinafer referred to as the Bayer solution); precipitating aluminum hydroxide at a temperature generally of 50° C. to 70° C. and separating the precipitated aluminum hydroxide from the alkali metal aluminate solution (the precipitation step); recycling a part of the precipitated aluminum hydroxide as seeds; withdrawing the remaining aluminum hydroxide as product; and recycling the alkali aluminate solution after the separation of aluminum hydroxide (hereinafter referred to as "spent liquor"), as it is or after evaporated to the first digestion step.

Generally, the bauxite contains organic substances mainly composed of humus, and these substances dissolve, as they are or as soluble salts, in the alkali aluminate solution in the bauxite digestion step. Further, a flocculating agent such as starch or a high molecular weight coagulant such as sodium polyacrylate and so on is added to the solution in the red mud separation step. Consequently, organic substances are gradually accumulated in the alkali aluminate solution of the Bayer process, and they are present in various forms from complex high molecular weight compounds to final decomposition products such as sodium oxalate.

In the Bayer process these organic substances precipitate from the alkali aluminate solution together with aluminum hydroxide in the precipitate step and can not be separated therefrom. When this precipitated aluminum hydroxide is recycled as seeds, the growth of aluminum hydroxide crystal is hindered, so that large-grain aluminum hydroxide can not be obtained. Also, aluminum hydroxide as the product is contaminated with the organic substances, which results in the lowering of purity. Further, the accumulated organic substances hinder the sedimentation of red mud and aluminum hydroxide in the Bayer process, thereby markedly lowering the efficiency of alumina production.

In order to overcome these difficulties, various methods have so far been proposed as follows: A method in which the bauxite is calcined prior to the digestion step to eliminate organic substances contained in it; and various methods for removing organic substances from the alkali aluminate solution in the Bayer process, for example, (1) a method in which said solution is electrolyzed with the direct or combined direct-alternating current to oxidation-decompose the organic substances with a nascent oxygen (Japanese Patent Publication No. 2831/1954), (2) a method in which said solution is brought into contact with pressurized oxygen gas to decompose the organic substances into alkali metal oxalate which is then precipitated by cooling the solution (Japanese Patent Publication No. 30458/1970), and (3) a method in which said solution is irradiated with rays in the presence of oxygen to decompose the organic substances [Japanese Patent Publication (unexamined) No. 20097/1974]. However, in practising these methods on a commercial scale, these methods are not suitable because the treatment cost is very high and the rate of decomposition of the organic substances is very low.

The inventors extensively studied to find a method for removing organic substances from the alkali aluminate solution which has no drawbacks described above. As a result, it was found that, by the wet oxidation of the aluminate solution in the presence of copper ions, the organic substances can be removed easily and besides with the additional effect that they can be decomposed to the stage of a carbonate that can never be reached by the prior arts. That is, in the production of alumina from the bauxite by the Bayer process, the present invention provides a method for effectively and economically removing organic substances from the alkali aluminate solution by contacting the aluminate solution containing organic substances with molecular oxygen gas or a molecular oxygen-containing gas of at least an amount corresponding to an oxygen amount necessary for oxidizing organic substances under a condition of at least a part of the aluminate solution maintaining a liquid state at a temperature of 180° C. to 300° C. in the presence of copper ions, thereby oxidizing organic substances, adding a chemical substance to the resulting aluminate solution which reacts with the copper ions to form a water-insoluble precipitate, precipitating the water-insoluble precipitate and separating the produced precipitate from the aluminate solution, and recycling the separated precipitate as a copper source to the oxidation step.

The present invention will be illustrated in detail hereinafter.

The method of the present invention can be applied to any alkali aluminate solution passing through the steps of the Bayer process. But, from the standpoints of oxidation temperature, liquor volume to be treated and ease of catalyst recovery after the oxidation treatment, the spent liquor from the aluminum hydroxide separation step of the Bayer process and the spent liquor after evaporation are preferred.

In the practice of the present invention, the alkali aluminate solution containing organic substances is first introduced into the wet oxidation procedure and the organic substances are oxidized, under such conditions that at least a part of the aluminate solution is maintained in a liquid state, at a temperature of from 180° C. to 300° C. under a pressure of from 20 to 150 kg/cm$^2$ in the presence of copper ions.

The amount of copper ions added to the aluminate solution is usually at least 100 mg/l, preferably 300 to 5,000 mg/l, based on the amount of copper ions in the aluminate solution. Copper ion contents of less than 100 mg/l are not desirable because such an amount will give rise to only slight effect of addition and prolong the period of time for the oxidation treatment. While the content more than 5,000 mg/l does not show enough effect to correspond to that amount. Consequently, the upper limit of the content is determined spontaneously from the economical point of view.

As the source of copper ion, there may be given a water-soluble cupric salt (e.g. cupric sulfate, cupric nitrate, cupric chloride) and a copper salt (e.g. cupric sulfide) which is water-insoluble in itself but becomes water-soluble in the condition of the wet oxidation according to the present invention.

In the present invention, a temperature below 180° C. is not desirable because the organic substances contained in the aluminate solution are not decomposed sufficiently in the wet oxidation, or because the period of time necessary for the oxidation is prolonged. While a temperature higher than 300° C. is not also desirable because the materials of the equipment are violently corroded, mainly due to the strong alkalinity of the aluminate solution.

As the oxidizing gas employed in the present invention, molecular oxygen gas or a molecular oxygen-containing gas is used. Particularly, air is preferred economically. The amount of the gas supplied for the wet oxidation is at least the amount theoretically required to oxidation-decompose a required amount of organic substances contained in the aluminate solution to be subjected to the wet oxidation, preferably at least the amount theoretically required to oxidation-decompose substantially all the organic substances, into harmless substances.

In the present invention, the copper ions used as the catalyst still remains in the aluminate solution after the wet oxidation. When such the aluminate solution is recycled to the Bayer process as it is, the copper ions is deposited together with aluminum hydroxide in the precipitation step of the Bayer process, which results in lowering in the purity of the product aluminum hydroxide and besides loss in the expensive copper ion source. Consequently, it is desirable to provide a recovery procedure for the copper ions in the aluminate solution after the wet oxidation.

In the recovery procedure for the copper ion source, the aluminate solution after the wet oxidation step is treated with a chemical substance capable of forming a water-insoluble precipitate by reaction with copper ions. Such the chemical substance is exemplified a sulfide such as sodium sulfide, hydrogen sulfide and the like. An amount of addition of the chemical substance is at least a stoichiometric amount, preferably 2 to 3 times as much as the amount, necessary for the reaction of the copper ions added to the aluminate solution. In the recovery procedure, for example, the sulfide reacts with copper ions to form a water-insoluble precipitate mainly composed of copper sulfide and deposits it. The precipitate thus formed is then separated by the usual solid-liquid separation techniques and as decantation, filtration and centrifugation, and reused as the copper ion source by being introduced, directly or after oxidation, into the wet oxidation step.

Since, however, such the water-insoluble precipitate produced in the aluminate solution forms a gel, it is very difficult to separate it from the solution. It is therefore more desirable to treat the aluminate solution containing organic substances as follows: The organic substances are oxidized under controlled conditions so that the efficiency of oxidation of the organic substances stops at 60 to 85%; before or after the aluminate solution to be oxidized is cooled to below 100° C., a chemical substances capable of forming a water-insoluble precipitate by reaction with copper ion is added to the aluminate solution; the produced water-insoluble precipitate is separated by the usual separation techniques such as decantation, filtration and centrifugation; and the separated precipitate is then reused by being introduced, directly or after oxidation, into the wet oxidation step of the organic substances. When the efficiency of oxidation is limited to 60 to 85% and the aluminate solution to be oxidized is cooled to below 100° C., a part of organic substances remaining in the aluminate solution precipitates as crystalline sodium oxalate. This sodium oxalate makes it very easy to separate the gel-form water-insoluble precipitate produced by the reaction of copper ions with the chemical substance such as a sulfide. Therefore, the use of small-sized solid-liquid separation equipment becomes possible. Further, when the separated precipitate is directly introduced into the wet oxidation step of the organic substances, sodium oxalate in the precipitate is easily oxidized to a carbonate, which is the final stage of oxidation.

The aluminate solution after the solid-liquid separation may be reused as it is by recycling it to the Bayer process. But, carbonates are formed by the wet oxidation and sulfates are formed in the catalyst recovery step, and when these salts are accumulated in the circulating aluminate solution of the Bayer process, the rate of precipitation of aluminum hydroxide in the precipitation step of the Bayer process is slowed down. Consequently, it is desirable to contact the aluminate solution containing the carbonates and sulfates with an caustic alkali such as calcium hydroxide thereby precipitating the carbonates and sulfates as calcium carbonate and calcium sulfate, respectively, remove these precipitates by the well-known solid-liquid separation techniques and recycle the resulting aluminate solution to the Bayer process as a circulating aluminate solution.

The method of the present invention will be illustrated more specifically with reference to the accompanying drawing, which is only given for the purpose of illustration and not to be interpreted as limiting the invention thereto.

FIG. 1 shows the systematic diagram of the Bayer process having the wet oxidation step of the present invention incorporated.

In the drawing, 1 is a raw material for alumina (bauxite), 2 is a digestion step, 3 is a red mud separation step, 4 is a precipitation step, 5 is an aluminum hydroxide separation step, 6 is a evaporation step, 7 is a wet oxidation step of the present invention, 8 is a catalyst recovery step, 9 is an oxidation step for the recovered catalyst and 10 is a causticization step.

The circulating aluminate solution, spent liquor from the evaporation step 6 is introduced into the wet oxidation step 7 and brought into contact with a molecular oxygen-containing gas (e.g. oxygen gas, air) at a predetermined temperature and pressure in the presence of copper ions. The organic substances in the spent liquor are thus oxidized. As the copper salt used as a catalyst, a copper salt in the storage tank 11 is supplied to the step 7, or the copper sulfide slurry obtained in the catalyst recovery step 8 is supplied to the step 7 as it is or after oxidized into copper sulfate with a molecular oxygen-containing gas (e.g. oxygen gas, air) in the oxidation step 9. The contact time depends upon the content of organic substances in the spent liquor to be treated, but generally it is more than 30 minutes.

The spent liquor thus treated is then introduced into the catalyst recovery step 8 wherein copper ions in the spent liquor are precipitated as copper sulfide by the addition of a sulfide. The spent liquor after the separation of the water-insoluble precipitate mainly comprising copper sulfide is then introduced into the causticization step 10, and the separated precipitate mainly comprising copper sulfide is introduced to the oxidation step 9 or wet oxidation step 7 and reused as the catalyst. The spent liquor introduced into the step 10 is reacted with a caustic alkali such as calcium hydroxide for converting sulfates and carbonates in the spent liquor to water-insoluble calcium sulfate and calcium carbonate, respectively. The precipitated calcium salts are removed from the spent liquor by filtration and the filtrate is recycled to the Bayer process as the circulating spent liquor.

In comparison with the conventional wet oxidation processes without a catalyst, the present invention described above in detail is superior in the following points: The period of time for the oxidation treatment can remarkably be shortened; organic substances in the circulating aluminate solution can be removed at the very high rate; a period of time required for the precipitation of aluminum hydroxide in the Bayer process is shortened very effectively; the copper ion catalyst can be reused in recycle step; and as a result the treatment cost is very low and secondary pollution owing to heavy metals does not occur. Consequently, the method of the present invention has large industrial effects.

In the flow-sheet of the accompanying drawing, the present invention is shown in the form of a continuous process, but it may be operated in either batch process or semi-continuous process.

Next, the present invention will be illustrated in detail with reference to the following examples, which are not however to be interpreted as limiting the invention thereto.

In the examples, the content of organic substances is shown in a carbon content by the elementary analysis.

EXAMPLE 1

0.3 liter of a spent liquor (composition: $Na_2O$ 150 g/l, $Al_2O_3$ 78 g/l, content of organic substances 20 g/l) from the spent liquor evaporation step of the Bayer process is introduced into a 1 liter nickel-made autoclave and kept at a temperature of 220° C. for 1 hour under an air pressure of 50 kg/cm². Thereafter, the content of organic substances in the spent liquor was measured, and it was found that the content was 17.4 g/l, showing that the efficiency of oxidation was 13%.

The oxidation treatment was carried out in the same manner as above except that cupric sulfate corresponding to 500 mg/l of copper was added to the autoclave. The content of organic substances was 10.6 g/l, showing that the efficiency of oxidation was 47%.

EXAMPLE 2

Using a spent liquor having the same composition as in Example 1, organic substances in the spent liquor were oxidized. The oxidation conditions i.e. the air pressure in autoclave, the reaction temperature, the kind of catalyst, the dosage of catalyst and the oxidizing time, are as shown in Table 1. The results are show in Table 1.

Table 1

| Exp. No. | Catalyst Kind | Dosage (mg/l) | Pressure (kg/cm²) | Temperature (°C.) | Oxidizing time (hr) | Content of organic substances (g/l) | Efficiency of oxidation (%) |
|---|---|---|---|---|---|---|---|
| 1 | Cupric sulfate | 50 | 50 | 220 | 1 | 17.0 | 15 |
| 2 | " | 100 | 50 | 220 | 1 | 13.6 | 32 |
| 3 | " | 1000 | 50 | 220 | 1 | 12.4 | 48 |
| 4 | " | 500 | 10 | 220 | 1 | 18.0 | 10 |
| 5 | " | 500 | 50 | 150 | 1 | 19.9 | 0.5 |
| 6 | " | 500 | 50 | 150 | 5 | 19.5 | 2.5 |
| 7 | " | 500 | 50 | 260 | 1 | 4.0 | 80 |
| 8 | Cupric nitrate | 500 | 50 | 220 | 1 | 10.7 | 46.5 |
| 9 | Copper sulfide | 500 | 50 | 220 | 1 | 10.6 | 47 |
| 10 | Cupric chloride | 500 | 50 | 220 | 1 | 10.6 | 47 |
| 11 | Silver sulfate | 100 | 50 | 220 | 1 | 17.0 | 15 |
| 12 | " | 500 | 50 | 220 | 1 | 17.0 | 15 |
| 13 | " | 1000 | 50 | 220 | 1 | 16.9 | 15.6 |
| 14 | Silver chloride | 500 | 50 | 220 | 1 | 17.0 | 15 |
| 15 | Cobalt sulfate | 500 | 50 | 220 | 1 | 17.4 | 13 |
| 16 | Nickel sulfate | 500 | 50 | 220 | 1 | 17.4 | 13 |
| 17 | Zinc chloride | 500 | 50 | 220 | 1 | 17.4 | 13 |
| 18 | Manganese sulfate | 500 | 50 | 220 | 1 | 17.4 | 13 |

EXAMPLE 3

0.3 liter of a spent liquor having the same composition as in Example 1 was introduced into a nickel-made autoclave and oxidized at a temperature of 260° C. for 1 hour under an air pressure of 50 kg/cm² in the presence of cupric sulfate (corresponding to 500 mg/l of copper). The spent liquor thus obtained had the following composition: $Na_2O$ 95 g/l, $Al_2O_3$ 78 g/l, content of organic substances 4 g/l. The spent liquor was then treated at a temperature of 60° C. for 30 minutes with addition of sodium sulfide of two equivalents based on the copper salt added as the catalyst. Thus, 0.22 g of cupric sulfide was obtained. The precipitated cupric sulfide thus obtained could be filtered very easily and the content of copper ions in the spent liquor after the separation of precipitate was 5 mg/l.

0.2 liter of said spent liquor was oxidized in the same manner as in Example 1 except that the cupric sulfide obtained above was used as the catalyst in an amount corresponding to 500 mg/l of copper. The content of organic substances in the thus treated spent liquor was 4 g/l, showing that the efficiency of oxidation was 80%.

EXAMPLE 4

0.3 Liter of a spent liquor having the same composition as in Example 1 was introduced into a nickel-made autoclave and oxidized at a temperature of 300° C. for 1 hour under an air pressure of 100 kg/cm² in the presence of cupric sulfate corresponding to 500 mg/l of copper. The content of organic substances in the spent liquor thus treated was 0.8 g/l (efficiency of oxidation 96%). The spent liquor was then treated at a temperature of 60° C. for 30 minutes with addition of sodium sulfide of two equivalents based on the copper salt added as the catalyst. Filtration of the formed precipitate was however difficult.

From the examples described above, the following conclusions can be made: When the conditions of oxidation temperature, pressure and dosage of catalyst are outside the scope of the present invention, the intended objects and effects can not be obtained; and metallic ions other than copper ion do not have any catalytic effect of promoting the oxidation of organic substances in an alkali aluminate solution. Furthermore, the copper sulfide recovered with a sulfide can be reused as the catalyst, which means that the present invention is very economical.

What is claimed is:

1. A method for removing organic substances from an alkali aluminate solution in the production of alumina from alumina-containing ores by the Bayer process or improved processes thereof, characterized by contacting the alkali aluminate solution containing organic substances with molecular oxygen gas or a molecular oxygen-containing gas of at least an amount corresponding to an oxygen amount necessary for oxidizing a required amount of organic substances contained in said aluminate solution under a pressure of 20 to 150 kg/cm$^2$ and under such conditions that at least a pair of said aluminate solution is maintained in a liquid state and at a temperature of 180° to 300° C. in the presence of at least 100 mg/l, based on the amount of said aluminate solution of copper ions, thereby oxidizing the organic substances, adding to the resultant aluminate solution a chemical substance, which reacts with the copper ions to form a water-insoluble precipitate, precipitating the water-insoluble precipitate and separating the produced preciptate from the aluminate solution, and recycling the separated precipitate as a copper source to the above oxidation step.

2. The method according to claim 1, wherein the efficiency of oxidation of organic substances in said aluminate solution is limited to 60 to 80% and then the aluminate solution, before the addition of the chemical substance is cooled to a temperature below 100° C.

3. The method according to claim 1, wherein the efficiency of oxidation of the organic substances in said aluminate solution is limited to 60 to 85% and then the aluminate solution after the addition of the chemical substances is cooled to a temperature below 100° C.

4. The method according to claim 1, wherein the aluminate solution free from the waterinsoluble precipitate is further subjected to a causticization treatment.

5. The method according to claim 1, wherein the oxidation treatment is applied to the circulating alkali aluminate solution after the separation of aluminium hydroxide in the Bayer process or improved processes thereof.

6. The method according to claim 1, wherein the oxidation treatment is applied to the concentrated alkali aluminate solution after the separation of aluminium hydroxide in the Bayer process or improved processes thereof.

7. The method according to claim 1, wherein the chemical substance is a sulfide.

8. The method according to claim 7, wherein the sulfide is sodium sulfide.

9. The method according to claim 1, wherein the source of the copper ion is a water-soluble cupric salt.

10. The method according to claim 1, wherein the source of the copper ion is copper sulfide.

11. The method according to claim 1, wherein the molecular oxygen-containing gas is air.

* * * * *